United States Patent
Gredler et al.

(10) Patent No.: US 10,336,172 B2
(45) Date of Patent: Jul. 2, 2019

(54) ENDLESS TRACK ENCLOSURE FOR TRACKED VEHICLES

(71) Applicants: Stefan Gredler, Karlsdorf-Neuthard (DE); Fredi Knoerr, Karlsdorf-Neuthard (DE); Juergen Mohr, Karlsdorf-Neuthard (DE); Uwe Rusch, Cape Coral, FL (US)

(72) Inventors: Stefan Gredler, Karlsdorf-Neuthard (DE); Fredi Knoerr, Karlsdorf-Neuthard (DE); Juergen Mohr, Karlsdorf-Neuthard (DE); Uwe Rusch, Cape Coral, FL (US)

( * ) Notice: Subject to any disclaimer, the term of this patent is extended or adjusted under 35 U.S.C. 154(b) by 53 days.

(21) Appl. No.: 15/157,727

(22) Filed: May 18, 2016

(65) Prior Publication Data
US 2017/0334495 A1 Nov. 23, 2017

(51) Int. Cl.
*B60J 11/06* (2006.01)
*B60J 11/10* (2006.01)

(52) U.S. Cl.
CPC ............... *B60J 11/06* (2013.01); *B60J 11/10* (2013.01)

(58) Field of Classification Search
CPC .. B60J 11/00; B60J 11/06; B60J 11/10; B62D 55/08; B62D 55/0845; B62D 55/32; B62D 55/088; B62D 25/168; B62D 25/18; B62D 25/182; B62D 25/188; B60B 3/062
See application file for complete search history.

(56) References Cited

U.S. PATENT DOCUMENTS

| | | | | |
|---|---|---|---|---|
| 1,303,224 A | * | 5/1919 | Achtmeyer | B62D 43/005 152/186 |
| 1,557,943 A | * | 10/1925 | Musto | B62D 43/00 206/304.1 |
| 3,770,035 A | * | 11/1973 | Haye, Sr. | B62D 25/168 206/304.1 |
| 3,871,042 A | * | 3/1975 | Farmer | B63B 7/08 114/346 |
| 4,024,820 A | * | 5/1977 | Hlinsky | B60P 3/073 410/3 |
| 4,126,169 A | * | 11/1978 | Magnuson | B62D 43/005 206/304.1 |
| 4,683,632 A | * | 8/1987 | Kalman | B25B 27/22 29/281.1 |

(Continued)

FOREIGN PATENT DOCUMENTS

| CA | 2170652 A1 | * 11/1997 | ............ B60C 13/04 |
|---|---|---|---|
| WO | WO-2006087483 A2 | * 8/2006 | ............ B60J 11/00 |

*Primary Examiner* — Joseph M Rocca
*Assistant Examiner* — Maurice L Williams
(74) *Attorney, Agent, or Firm* — William E. Noonan; George F. Wallace

(57) ABSTRACT

A bag is disclosed for covering an endless track or chain of a tracked heavy equipment vehicle during transport. The bag includes an outer segment for covering an outer portion of the track extends laterally beyond side edges of the trailer flatbed. Forward and rearward lobes of the bag, respectively engage and cover forward and rearward ends of the track. An inner bag segment engages and covers the track between the side edges of the flatbed trailer supporting the tracked vehicle. A recess in an inside segment of the bag accommodates a track and allows the track to directly engage the supportive trailer. Tensioning straps and cords are used to further secure the bag to the track.

17 Claims, 8 Drawing Sheets

(56) References Cited

U.S. PATENT DOCUMENTS

| | | | | |
|---|---|---|---|---|
| 5,921,389 A * | 7/1999 | Zoffer | B60J 11/00 | 150/167 |
| 5,957,796 A * | 9/1999 | McLean | F04B 23/00 | 417/313 |
| 6,059,105 A * | 5/2000 | Allain | B60J 11/00 | 150/166 |
| 6,109,655 A * | 8/2000 | Wheeler | B60J 11/06 | 280/154 |
| 6,129,408 A * | 10/2000 | Schultz | B60J 11/00 | 150/166 |
| 6,142,192 A * | 11/2000 | Dickinson | B60C 25/147 | 141/114 |
| 6,273,159 B1 * | 8/2001 | Page | B60B 39/12 | 152/170 |
| 6,273,493 B1 * | 8/2001 | Woo | B60J 11/00 | 150/166 |
| 6,478,363 B2 * | 11/2002 | Jensen | B62J 19/00 | 296/136.07 |
| 6,499,591 B1 * | 12/2002 | Rizzo | B60B 7/0053 | 206/303 |
| 6,505,765 B1 * | 1/2003 | Proctor | A45C 7/0063 | 224/413 |
| 7,093,908 B2 * | 8/2006 | Garrett | B60J 11/10 | 301/37.103 |
| 7,175,058 B2 * | 2/2007 | Chiku | B62D 43/005 | 206/304.1 |
| 7,210,728 B1 * | 5/2007 | Gillig | B60J 11/00 | 135/93 |
| 7,213,893 B1 * | 5/2007 | McCraw | B60J 11/00 | 280/847 |
| 7,478,723 B2 * | 1/2009 | Spater | B62D 43/005 | 206/304.1 |
| 2004/0074577 A1 * | 4/2004 | Tavelli | B60J 11/00 | 150/166 |
| 2004/0262941 A1 * | 12/2004 | Johnson | B60P 3/062 | 296/100.01 |
| 2007/0194598 A1 * | 8/2007 | Perniciaro | B60J 11/00 | 296/136.08 |
| 2009/0140541 A1 * | 6/2009 | Suh | B60J 11/00 | 296/136.01 |
| 2011/0215125 A1 * | 9/2011 | Lopez | A45C 7/0068 | 224/576 |
| 2014/0353103 A1 * | 12/2014 | Hogan | A45C 5/14 | 190/103 |
| 2015/0034440 A1 * | 2/2015 | Lai | A45C 7/0027 | 190/103 |
| 2016/0090029 A1 * | 3/2016 | Levytsky | B60J 11/04 | 340/473 |
| 2016/0236731 A1 * | 8/2016 | Villarreal, Sr. | B62D 55/088 | |
| 2016/0365015 A1 * | 12/2016 | Young | G09F 21/048 | |
| 2017/0144526 A1 * | 5/2017 | Super | B60J 11/10 | |

* cited by examiner

ENDLESS TRACK ENCLOSURE FOR TRACKED VEHICLES

FIELD OF THE INVENTION

This invention relates to a flexible enclosure or bag for covering the endless chain or track of a crawler tractor or other tracked, heavy equipment vehicle during transport of the vehicle.

BACKGROUND OF THE INVENTION

A wide variety of tracked vehicles are used in assorted heavy equipment applications such as earth moving, construction, drilling, excavation, road work, agriculture, etc. These vehicles typically utilize a pair of endless metal tracks, which are also referred to as chains or crawlers, for driving the vehicle across the earth. Between jobs, tractors and other tracked vehicles typically must be transported by means of a flatbed trailer to a storage facility or another job site. Unfortunately, during the course of many, if not most jobs, the vehicle is apt to collect rocks, stones, dirt, gravel and other debris in and around the links of the endless tracks. Such debris is easily dislodged and dropped during subsequent highway transport of the vehicle. This can cause serious damage to passing vehicles. As a result, the heavy equipment owner can be subject to expensive damage claims and increased insurance costs. The material dropped from the exposed chains also creates a serious roadway hazard.

To avoid the potential damage and danger caused by falling rocks, earth and debris, the heavy equipment operator can carefully clean the links of the endless track before the tracked vehicle is transported on the trailer. Such cleaning usually involves considerable time, labor and expense, particularly when a large piece of equipment is involved. In many cases, transport of the vehicle cannot be delayed and there is simply insufficient time to tediously and meticulously remove the earth and debris from the tractor chain in a sufficiently comprehensive manner.

SUMMARY OF THE INVENTION

It is therefore an object of the present invention to provide a flexible enclosure or bag for effectively and protectively covering the endless tracks of a tractor or other tracked vehicle during transport of the vehicle so that potential damage to nearby vehicles is avoided and roadway safety is improved.

It is a further object of this invention to provide an enclosure/bag for heavy equipment crawler tracks, which greatly reduces the potential damage and accompanying costs that may be caused by debris falling from the endless tracks of a transported piece of heavy equipment.

It is a further object of this invention to provide a bag for covering the endless tracks of a crawler tractor, which eliminates the time, expense and labor required to clean the tracks of the tractor prior to transport.

It is a further object of this invention to provide a covering for the endless tracks of a tracked vehicle, which may be installed quickly and securely and which may likewise be removed and stored in a quick and convenient manner.

This invention features a bag for covering the endless track of a tracked heavy equipment vehicle during transport of the vehicle upon a flatbed trailer. The bag is composed of flexible material and has an interior opening for receiving an endless track of a tractor. The opening has a longitudinal axis that is alignable with a longitudinal axis of the endless track to be covered. The bag has outer and inner segments for respectively engaging and covering exposed outer and inner portions of the endless track that extend laterally beyond the flatbed trailer and sit upon the trailer respectively. The bag also has forward and rearward lobes for engaging and covering respective ends of the endless track. An entrance into the interior opening of the bag may be surrounded by a cord that extends through a channel in the bag. The cord is pulled manually or elastically to reduce the size of the opening and engage the bag securely about the endless track. At least one peripheral strap is formed interiorly and/or exteriorly about the bag. The strap extends longitudinally through the outer segment and of the bag. A length-adjusting clamp mechanism is attached to the strap exteriorly of the bag. The length-adjusting mechanism is operated in a ratchet-like fashion to tighten the strap against the endless track such that the bag securely grips the endless track internally of a flatbed or trailer supporting the track. Fastening means interconnect interiorly facing segments of the lobes of the bag to further secure the bag in place on the track.

In a preferred embodiment, the bag includes at least one air outlet on its outwardly facing segment for allowing air traveling through an enclosed endless track to escape therethrough. A handle may also be provided proximate the air outlet hole for facilitating manipulation of the bag. An advertising flap may be secured to an upper portion of the bag and selectively unfurled across the outwardly facing section of the bag to display an advertisement on an outer surface thereof. Complementary hook and loop fasteners may be attached respectively to a distal end of the flap and the outwardly facing segment of the bag for securing the flap against the outwardly facing segment to display the advertising printed thereon.

A fluorescent reflector may be carried on an exterior surface of the bag. The reflector may mark an outline of an underlying endless track accommodated within the bag. The bag may carry a longitudinal zipper mechanism that is selectively opened to allow the bag and an interior of the bag to be expanded for accommodating a larger (i.e. wider or taller) endless track. Alternatively, the zipper mechanism may be closed to provide the bag and the interior opening of the bag with a smaller size for accommodating correspondingly smaller endless tracks. The bag may utilize a non-adhesive material that resists the formation/collection of condensation moisture, dirt and ice thereon. This further reduces the chance that material will be shed from the vehicle or that bag during transport by a flatbed trailer.

BRIEF DESCRIPTION OF THE DRAWINGS

Other objects, features and advantages will occur from the following description of a preferred embodiment and the accompanying drawings, in which.

DETAILED DESCRIPTION OF PREFERRED EMBODIMENTS

Figure 1:
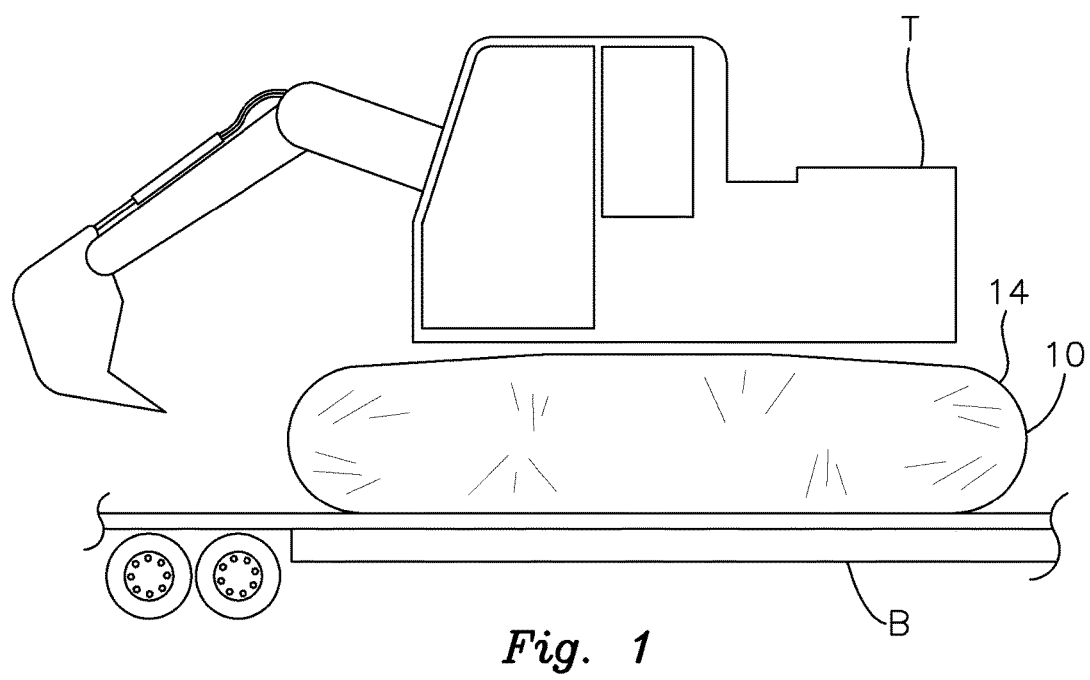
FIG. 1 is a perspective view of a tracked vehicle being transported on a flatbed trailer with the bag of this invention covering the endless tracks of the vehicle.

There is shown in FIGS. 1-6B a flexible bag 10 for enclosing the endless track 12 of a crawler tractor T or other type of a heavy equipment tracked vehicle mounted on a trailer bed B. Bag 10 may be employed on virtually any type of vehicle employing an endless track, chain or crawler. This includes vehicles involved in the construction, forestry, agriculture, technical assistance services, emergency services and roadwork industries, as well as in military applications. The particular application/use of the tracked vehicle does not constitute a limitation of this invention and bag 10 may be employed effectively on virtually any and all such vehicles.

Bag 10 is composed of a flexible, lightweight material. A preferred composition includes a light knitted, anti-tear polyester (e.g. 1100 dTex) with a non-adhesive double silicone covering that is both dirt resistant and impermeable to water. In addition, this material restricts the formation of dew and will not freeze to chains or other surrounding metallic objects. The material should be capable of performing properly at temperatures between −25° C. and +50° C. Bag 10 should be tear resistant with a specification of 52/35 daN (DIN 53363). It may have a water density of >0.5 bard, NF EN ISO 1734. The size may be varied as needed to accommodate the particular chain, crawler or track to be covered.

Bag 10 has an elongate configuration that generally conforms to the shape of the enclosed endless track. Indeed, bag 10 is designed for covering and enclosing a respective endless track. Bag 10 includes an outer portion 14 having a shape and size for surrounding and covering the portion of track 12 that typically extends laterally beyond trailer bed B. An inner bag part 16 covers the top and both ends of the portion of track 12 mounted on trailer bed B. Inner portion 16 includes a lower recess 24 that is formed in the bag to permit the bag to accommodate the inner portion of the track that directly engages the underlying trailer bed when the bag is attached to the track. Specifically, the inner portion of the track directly engages the top of bed B through recess 24. The recess thereby allows bag 10 to be conveniently fitted onto a track already mounted on the trailer bed so that the part of the track that extends laterally beyond the trailer bed is fully covered and at least the top and both ends of the part of the track resting on the trailer bed are similarly covered by the bag. Bag 10 also features an interior opening 19 for receiving the endless track through an inwardly facing entrance into the bag.

Figure 2A:
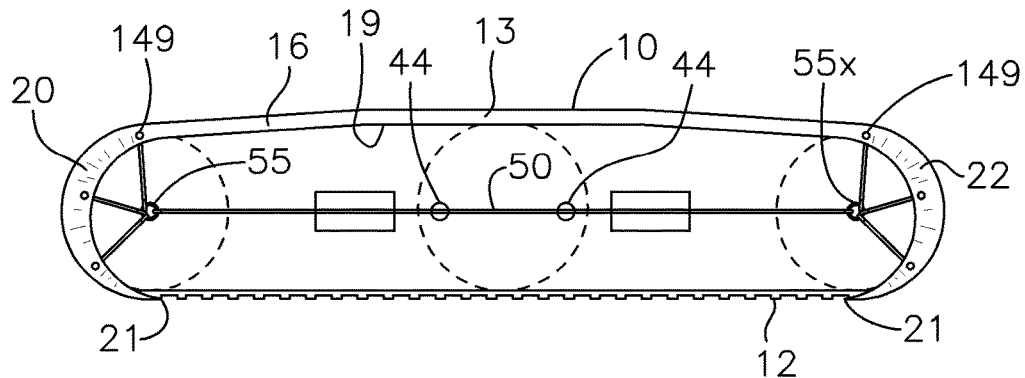
FIG. 2A is a side elevational view of the bag of FIG. 1 with the interior opening exposed.
Figure 2B:
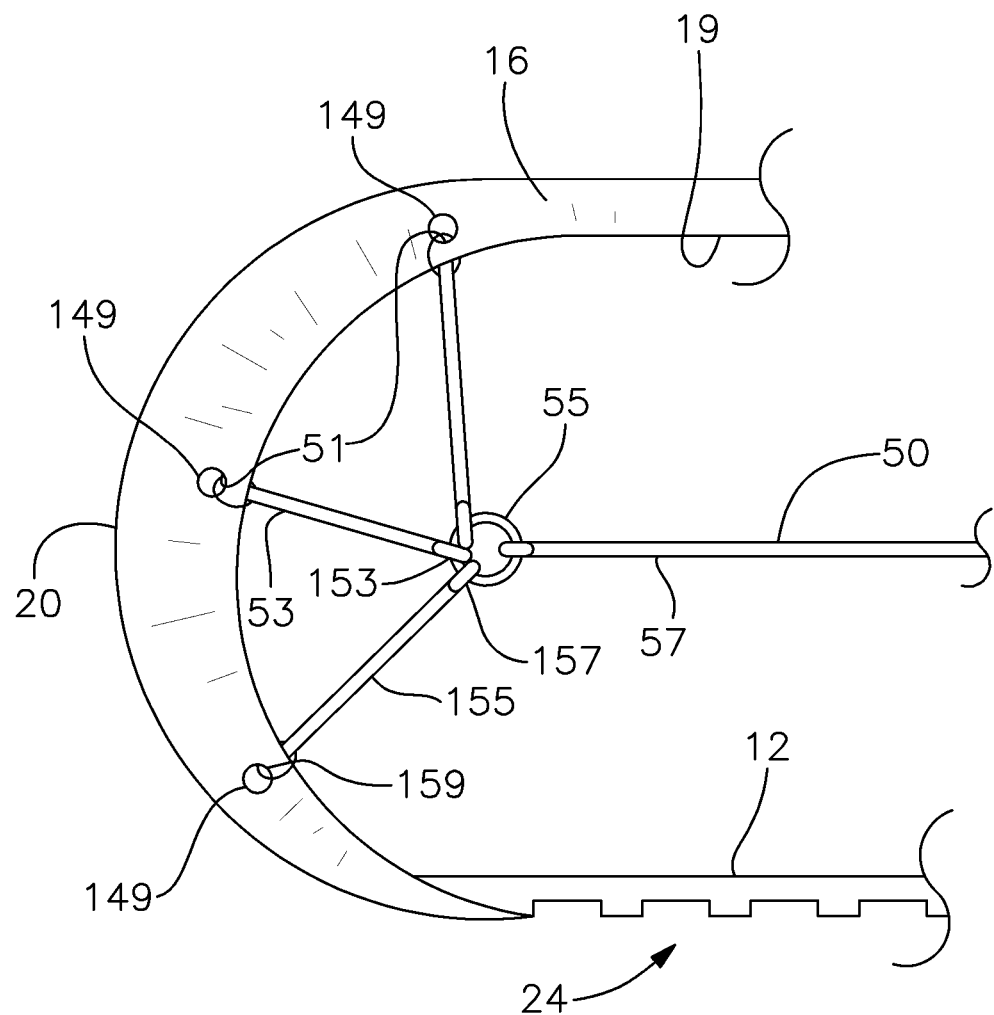
FIG. 2B is a side elevational view of one of the end lobes of the bag with tension straps engaged to hold the bag securely onto the endless track.
Figure 6A:
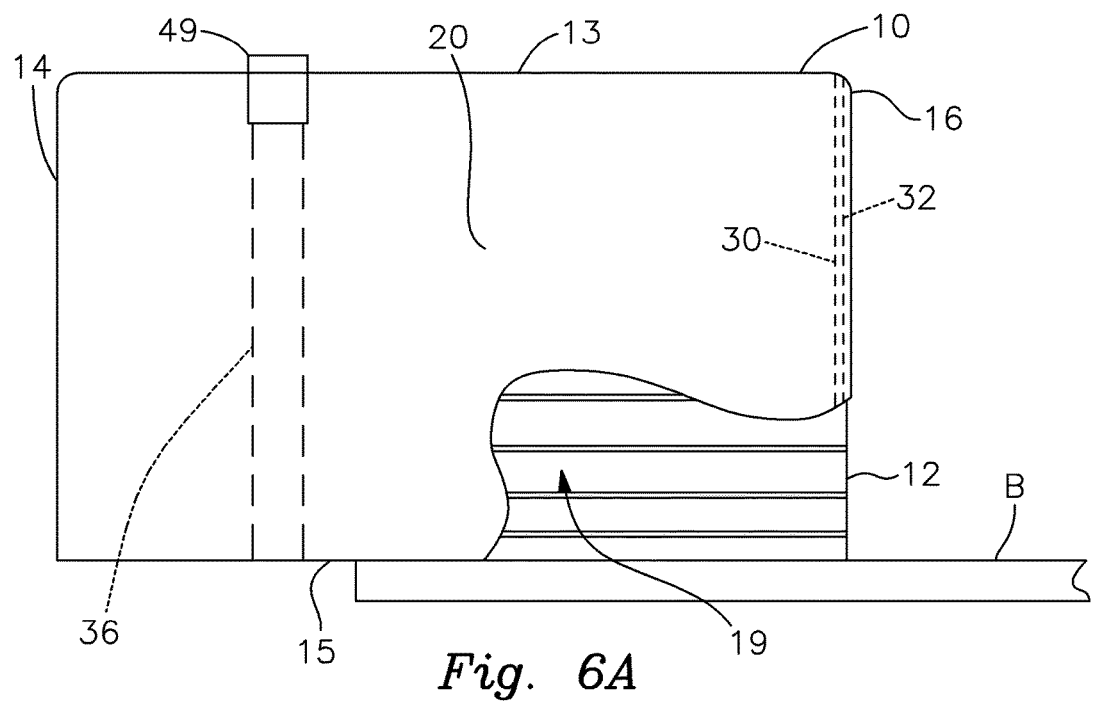
FIG. 6A is an elevational and partly cut away end view of the bag attached to an endless track of a vehicle mounted on a flatbed trailer and specifically illustrating full coverage of an end of the track by one of the lobes of the bag.
Figure 6B:
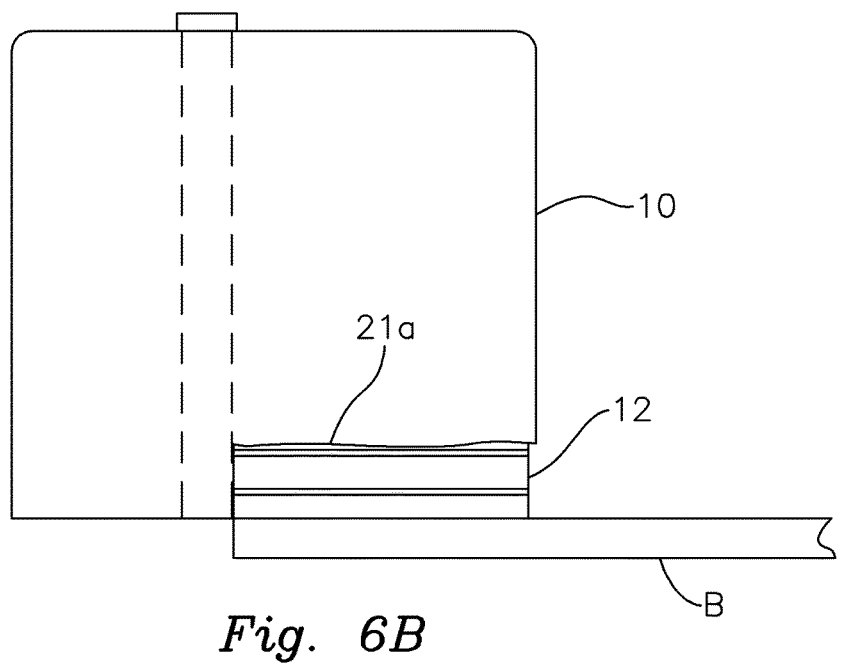
FIG. 6B is an elevational end view of a slightly modified bag wherein an inner portion of the end lobe terminates above the lower segment of the bag to provide clearance above the flatbed trailer.
Figure 7:
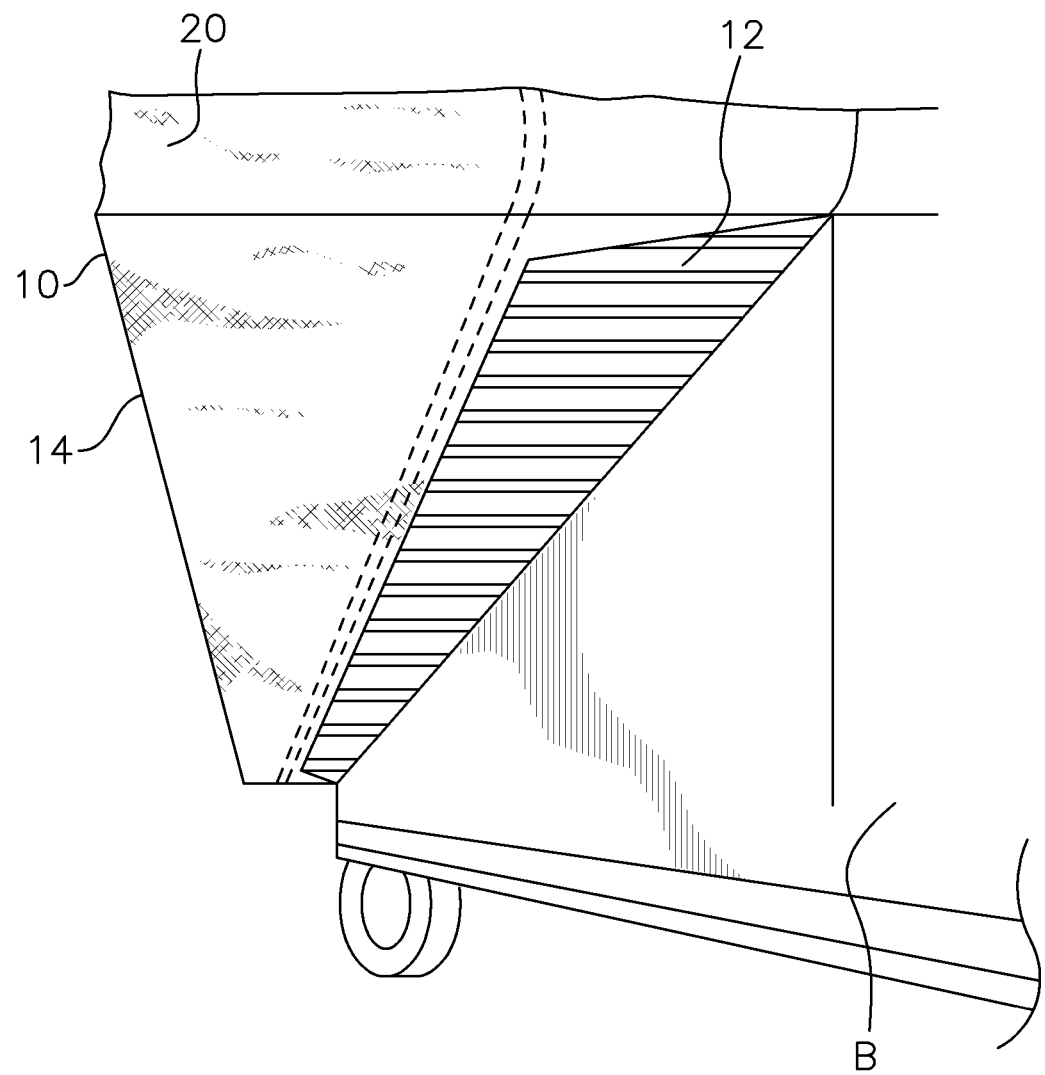
FIG. 7 is a lower perspective view of the bag with a bottom segment of the bag engaging the bottom portion of an endless track that extends laterally of the flatbed trailer carrying the endless track vehicle.

The bag features a pair of leading and trailing lobes 20 and 22, respectively, that wrap about and engage the forward and trailing ends of endless track 12. As best depicted in FIGS. 2A and 2B, each of lobes 20 and 22 has an expandable accordion-like configuration that allows that end of the bag to be tightly and snugly fitted against a respective end of the endless track. The expandable lobes accommodate different track sizes. As a result, the ends 20 and 22 engage and cover the respective ends of track 12 as shown in FIGS. 2B and 6A. Within outer bag portion 14, each lobe is integrally connected to the sections of the outer bag portion covering the upper and lower sections respectively of endless track 12. At least within the inner bag portion 16, each lobe terminates at an angled lower edge 21, FIGS. 3 and 5, bordering recess 24. Outer portion 14 of bag 10 includes a lower longitudinal edge 25 that extends between respective lower edges 21 of lobes 20, 22 outwardly of trailer bed B. This defines recess 24 in inner portion 16. Track 12 is thereby enclosed by outer portion 14 of bag B for most of, if not virtually the entire outer portion of track 12 that extends outwardly beyond trailer bed B. Lobes 20, 22 and an upper segment 13 of bag 10 likewise cover the inner part of track 12 that does not directly engage the underlying bed B between leading and trailing edges 21. As a result, most of track 12, if not virtually the entire portion of track 12 that does not directly touch platform B is covered by bag 10 so that debris falling from the track is captured by the bag. See FIG. 7 wherein a somewhat exaggerated amount of track 12 is exposed to illustrate coverage of bag 10 over that portion of the track that extends laterally beyond the side of the trailer bed B.

Figure 3:
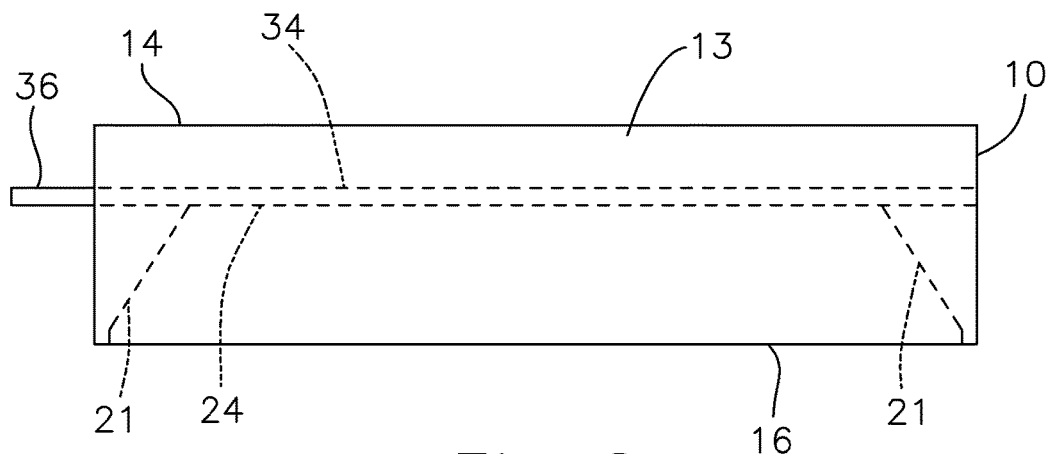
FIG. 3 is a top plan view of the bag.
Figure 5:
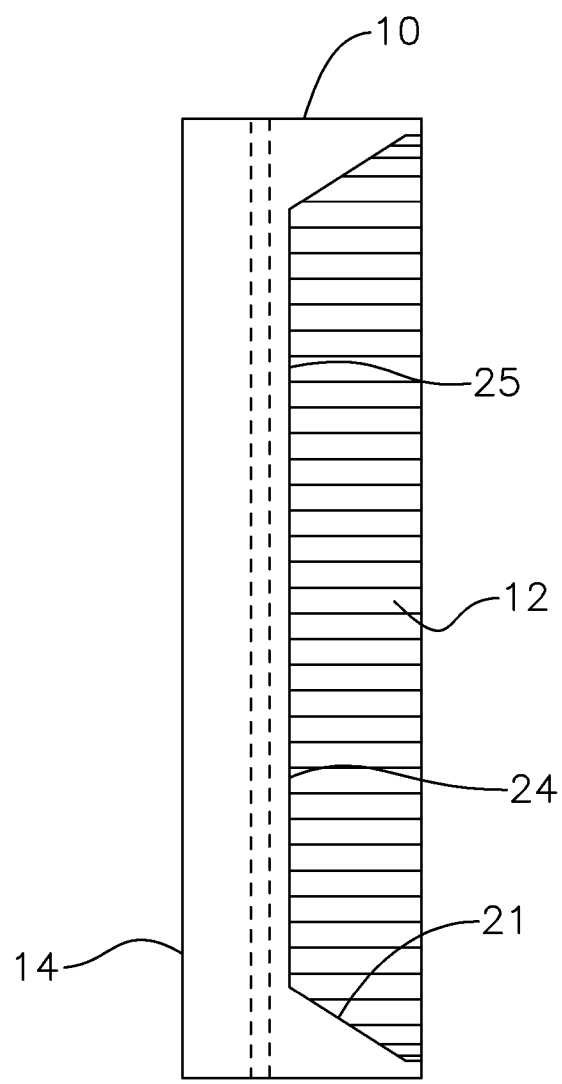
FIG. 5 is a bottom plan view of the bag as attached to an endless track.

FIGS. 3 and 5 depict tapered or angled lower edges 21. However, it should be understood that the lower edges of lobes 20 and 22 within the inner portion 16 of bag 10 may alternatively be cut laterally straight across the inner bag portion 16 and located a bit above trailer bed B as depicted by edge 21a in FIG. 6B. The recess 24 formed in inner bag portion 16 (which allows the inner part of the track to directly engage the trailer bed therethrough) may feature various configurations within the scope of this invention.

As shown in FIG. 6A, the inner portion 16 of bag 10 may include a longitudinal channel 30 that extends along the edge of the entrance into opening 19. Channel 30 accommodates a cord or a rope 32 that may be selectively pulled and tightened after the bag is engaged with the track to close the entrance opening 19 and thereby more snugly fit the bag onto track 12. Element 32 may also comprise an elastic cord or elastic seam formed about opening 19 for holding the opening in snug interengagement with the track so that debris that dislodges from the track during transport is retained in the bag.

Outer portion 14 of bag 10 may include a sleeve 34, FIG. 3, for accommodating a gripping strap 36, FIGS. 3 and 6A. This strap, which may include a single piece or multiple, longitudinally integrated segments, extends longitudinally through the bag and encircles portion 14 of bag 10 that extends beyond flatbed B. A standard ratchet-type tightening buckle 49 is operated in a known manner to tighten the strap about the bag such that it snugly engages the track 12 received within the bag. This helps to secure the bag to the track and maintains a snug gripping interengagement between the bag and the track. In alternative embodiments, multiple tightening straps may be interconnected longitudinally about the track.

Figure 4:
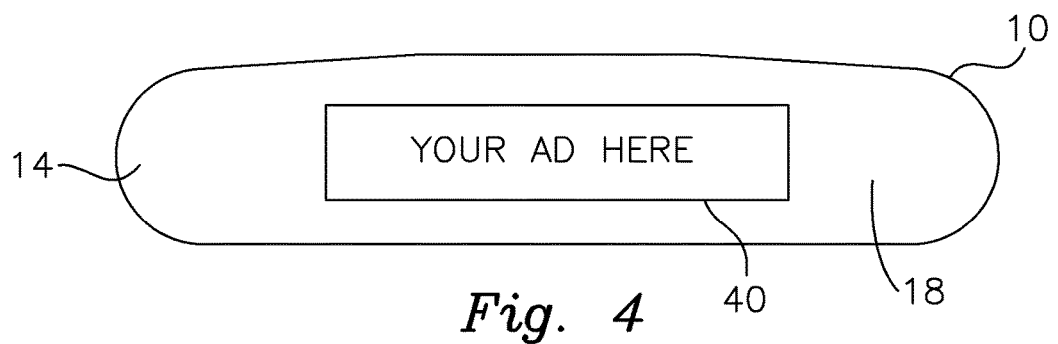
FIG. 4 is a side elevational view of the outwardly facing segment of the bag with the advertising flap lowered to display advertising on the bag.

As shown in FIG. 4, the outwardly facing surface 18 of outer bag portion 14 includes an optional advertising flap 40 that is secured along its upper edge to surface 18. Appropriate advertising may be printed on the flap as best shown in FIG. 1. When the flap is raised, this exposes holes 44, FIG. 2, in the bag surface 18. These holes allow air flow through the bag so that such air is not trapped within the bag as the tracked vehicle is being transported with the bag 10 attached thereto. Holes 44 also provide access to handles which comprise straps and hooks that may be connected to the landing gear of the vehicle to further secure the bag to the vehicle.

The interior edge of bag opening 19 is further secured in snug interengagement with the track of the tracked vehicle by a tension strap assembly 50 shown in FIGS. 2A and 2B. In particular, each of end lobes 20, 22 carries a plurality of grommets 149. As shown more particularly for lobe 20 in FIG. 2B, two of the grommets are attached by a releasable clips or connectors 51 to respective ends of a diverging strap 53. An intermediate point of the diverging strap is similarly fastened by a clip 153 to a ring 55. A strap 155 is likewise secure by end clips 157 and 159 respectively to ring 55 and lowermost grommet 149. A medial connecting strap 57 interconnects ring 55 with a second ring 55x, FIG. 2A, which is similarly secured to lobe 22 of bag 10. Assembly 50 thereby helps to hold bag 10 securely over track 12 so that debris is contained within the bag during transport and potential damage to surrounding vehicles is reduced.

Figure 8:
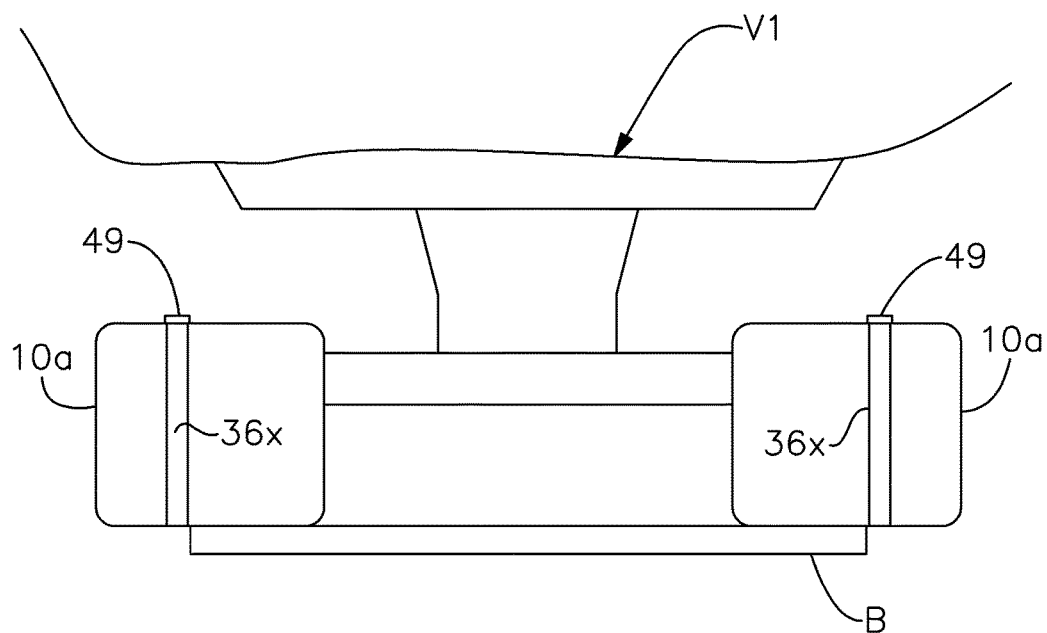
FIG. 8 is an end view of a pair of bags according to this invention engaged with and covering respective endless tracks of a tracked vehicle; exterior straps snugly secure each bag about a respective track.

In the alternative version shown in FIG. 8, bags 10a are shown covering respective tracks of an endless track vehicle V1. Each bag 10a may be constructed in a manner generally similar or analogous to that previously described. In addition, each bag 10a may include various arrangements of encircling straps 36x that are wrapped peripherally about the bag and the accommodated track. Such straps may be formed either exteriorly or within an inner sleeve of the bag. Each strap 36x may comprise a multiple-piece strap. In each case, a standard tension adjusting clamp 49 typically joins respective pieces of the strap and allows the tension of the overall strap to be adjusted so that the bag is snugly and securely fitted about the covered endless track. Appropriate hooks/clips, not shown, may be formed at each end of the respective straps to securely and releasably interconnect the straps. It should be understood that various alternative strap configurations may be employed within the scope of this invention. For example, as previously described, a single strap 36, shown in FIGS. 6A and 6B, may encircle the entire perimeter of bag 10 about track 12 and be contained largely within a sleeve running through the bag. In such cases, the tightening clamp 49 is exposed for access. Some versions may employ multiple encircling straps. A clamp 49 may be used to selectively tighten each such strap.

Figure 9:
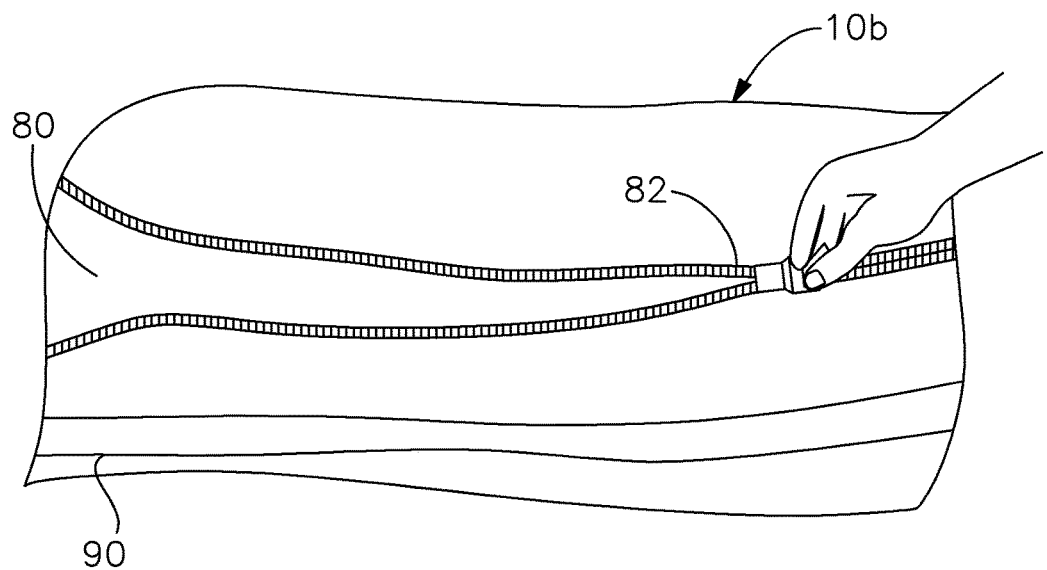
FIG. 9 is a perspective view depicting a bag according to this invention employing a zipper adjustment for selectively expanding the size of the bag.

As shown in FIG. 9, an alternative crawler-accommodating bag 10b may be provided with an expandable extension section 80 that is selectively closed and opened by operating, a zipper 82 that extends along the length of the bag. By opening the zipper, extension section 80 is exposed such that the bag may be expanded for accommodating a larger size crawler track. When a smaller bag size is required, the operator simply closes zipper 82, which hides extension section 80 and reduces the size of bag 10b for accommodating a smaller track.

Figure 10:
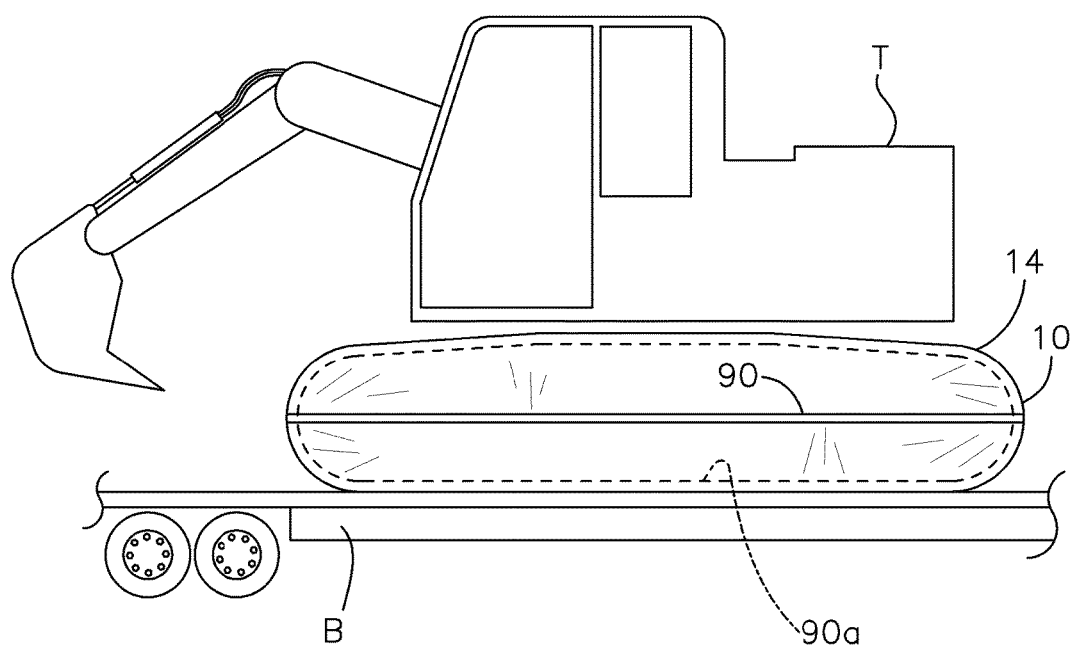
FIG. 10 is a perspective view of an alternative bag on an endless track of a crawler tractor in accordance with this invention and featuring a reflector strip.

As shown in FIGS. 9 and 10, a fluorescent strip 90 may be formed along the bag for visually highlighting the bag and making the transported vehicle much more visible to passing traffic, particularly at night and during inclement weather conditions. Such an illuminating strip may be formed at various locations on the bag. The strip 90a may be optionally attached to the bag such that when the bag is engaged with a covered track, a clear outline of the track is provided for passing vehicles.

In operation, the bag 10, 10a, 10b is stored in its own portable transport bag. After the tracked vehicle is mounted on the flatbed trailer for transport, the bag is removed from its storage bag and engaged with a respective track of the vehicle. The bag is stretched out adjacent to the track or chain to be covered. Initially, the front end of the cover is placed over a corresponding end of the endless track. The adjustment straps are tightened over the front lobe so that the bag does not fall off and is secured both vertically and horizontally to the front end of a respective track.

After the foregoing step is completed, the remainder of the bag is pulled over the track from front to back. After the bag has covered the entire track or landing gear, the precise position of the bag is carefully checked from front to back. Tension straps 50, 53, and 155 are used to secure the forward and rearward ends of the bag in place about the forward and rearward ends of the respective covered track. This prevents the covering from loosening and falling from the track while the tracked vehicle is being transported on a trailer.

By raising advertising flap 40, FIG. 5, the installer is able to access handle holes 44. Hooks and straps found within the bag proximate the holes are hooked onto any readily accessible portion of the track's landing gear. This ensures that the bag snugly fits against the landing gear and prevents the bag from filling with air as the vehicle is being transported. After the appropriate fastening attachments are made, the flap 40 is lowered to cover holes 44.

With the bag securely fastened about a respective endless track, the tracked vehicle may be transported in a much safer and less dangerous manner. In particular, dirt, rocks, stones and other debris that are normally dislodged from the metal track during highway transport are collected by the bag and particularly outer portion 14 of the bag. Such material is much less apt to fly off of the flatbed trailer and strike passing vehicles. Damage to such vehicles and the costs associated therewith are thereby greatly reduced. By the same token, time consuming and labor intensive cleaning of the tracks is not required prior to transport.

When the transported vehicle arrives at its destination, the flap 40 is again raised and secured by an appropriate Velcro attachment. This provides access to the holes 44 so that attachment hooks and straps may be disengaged from the landing gear of the track. After these straps are disconnected, the bag retaining straps are released by loosening clamps 49 and the bag is removed from the track.

The previously described material comprising the bag has an effective anti-adhesive quality that prevents dirt, ice and snow from attaching to the bag. The bag is therefore effective for use regardless of weather or climate conditions. Moreover, the bag does not have to be constantly cleaned and can be quickly and conveniently stored in its storage/transport bag or other container when not in use.

Bag 10, 10a, 10b is quickly and effectively fastened to and removed from a respective track, as required, so that the track is effectively and protectively covered during transport. The tensioning and fastening straps can be quickly and conveniently checked at any time during the transportation process. The bag may be constructed to fit virtually any size of chain or track. Holes 44 facilitate the passage of air through the bag and further prevent air from filling the bag during transport. As a result, more aerodynamic transport is enabled.

From the foregoing it may be seen that the apparatus of this invention provides for flexible enclosure/bag for covering the endless chain or track of a tracked heavy equipment vehicle during transport of the vehicle.

While this detailed description has set forth particularly preferred embodiments of the apparatus of this invention, numerous modifications and variations of the structure of this invention, all within the scope of the invention, will readily occur to those skilled in the art. Accordingly, it is understood that this description is illustrative only of the principles of the invention and is not limitative thereof.

Although specific features of the invention are shown in some of the drawings and not others, this is for convenience only, as each feature may be combined with any and all of the other features in accordance with this invention.

What is claimed is:

1. A bag assembly for covering an endless track of a heavy equipment vehicle during transport of the vehicle upon a flatbed trailer, said bag assembly comprising:
    a flexible outer bag portion for surrounding and covering a portion of the endless track that extends laterally beyond a side edge of the flatbed trailer;
    a flexible inner bag portion joined to said outer bag portion for partially covering a portion of the endless track disposed laterally inwardly of the side edge of the trailer bed, said inner and outer portions including forward and rearward lobes for respectively covering forward and rearward end portions of the endless track, said inner bag portion including a recess for accommodating a bottom section of the endless track such that said bottom section of said endless track engages the trailer bed directly through said recess, said inner bag portion further including an inwardly facing inner edge segment that wraps around and vertically covers and obscures an inwardly facing interior edge of the endless track for the entire portion of the endless track that does not directly touch the trailer; and
    a tension strap assembly interconnected and extending longitudinally between opposing locations of said inwardly facing inner edge segment on respective said lobes, said tension strap assembly pulling respective portions of said inwardly facing inner edge segment together to hold the bag in snug interengagement with a covered track such that debris dislodged from the inwardly facing interior edge of the track during transport is retained within the bag, said tension strap assembly including a medial connecting strap that extends between said forward and rearward lobes inwardly of the inwardly facing interior edge segment of the endless track, said tension strap assembly further including a plurality of diverging straps, each interconnected between said medial strap and a respective strap connector carried by said inwardly facing inner edge segment of said bag.

2. The bag assembly of claim 1, further including a strap that extends about said outer portion of said bag assembly and further including a length-adjusting clamp mechanism attached to said strap exteriorly of said outer portion of said bag for being operated to selectively tighten or loosen said outer portion of said bag about said portion of said track extending laterally of said side of said trailer bed on which said track vehicle is mounted.

3. The assembly of claim 1 in which each lobe includes an expandable, pleated configuration extending across said lobe, which allows the lobe to be tightly and snugly fitted against a respective end of the endless track.

4. The bag assembly of claim 1 in which each said strap connector includes a grommet formed through said inwardly facing inner edge segment of said bag.

5. The bag assembly of claim 1 in which said inwardly facing inner edge segment of said inner portion of said bag extends for a full length of each of said forward and rearward lobes.

6. A system for transporting a heavy equipment vehicle, said system comprising:
    a heavy equipment vehicle having an endless track for moving said vehicle;
    a trailer having a bed for supporting said heavy equipment vehicle during transport of said vehicle such that a portion of said endless track extends laterally beyond a side edge of said trailer bed;
    a flexibly collapsible bag for covering said endless track of said heavy equipment vehicle during transport of said vehicle on said trailer, said bag including an outer bag portion for surrounding and covering said portion of said endless track that extends laterally beyond the side edge of said trailer bed; and an inner bag portion joined to said outer bag portion for partially covering a portion of said endless track disposed laterally inwardly of the side edge of said trailer bed, said inner and outer portions including forward and rearward lobes for respectively covering forward and rearward end portions of said endless track, said inner bag portion including a recess for accommodating a bottom section of said endless track such that said bottom section of said endless track directly engages said trailer bed through said recess, said bag having an interior opening for accommodating the endless track and an entrance into said interior opening through which said endless track is selectively introduced and removed, said inner portion of said bag further including an inwardly facing inner edge segment through which said entrance into said interior opening of the bag is formed, which inwardly facing inner edge segment wraps around, extends vertically across, and covers and obscures an inwardly facing interior edge of said endless track for the entire portion of said inwardly facing interior edge of said endless track that does not directly touch said bed of said trailer; and
    a tensioning assembly engaged with and carried by said inwardly facing inner edge segment inside of said endless track to pull together opposing portions of said inwardly facing inner edge segment on respective said lobes, which constricts said entrance of said opening of said bag and holds the bag in snug interengagement with and covering said inwardly facing interior edge of said covered endless track such that debris dislodged from said inwardly facing interior edge of said endless track during transport is retained more effectively within said bag.

7. The system of claim 6, further including a strap that extends about said outer portion of said bag assembly and further including a length-adjusting clamp mechanism attached to said strap exteriorly of said outer portion of said bag for being operated to selectively tighten or loosen said outer portion of said bag about the portion of said track extending laterally of said side of said trailer bed on which said track vehicle is mounted.

8. The assembly of claim 6 in which each lobe includes an expandable, pleated configuration extending across said lobe, which allows the lobe portion to be tightly and snugly fitted against a respective end of the endless track.

9. The system of claim 6 in which said tensioning assembly includes a tension strap assembly interconnected and extending longitudinally between opposing locations of said inwardly facing inner edge segment on respective said forward and rearward lobes, said tension strap assembly pulling respective portions of said inwardly facing inner edge segment together to hold the bag in snug interengagement with said endless track such that debris dislodged from said inwardly facing interior edge of said track during transport is retained within said bag.

10. The system of claim 9 in which said tension strap assembly includes a medial connecting strap that extends between said forward and rearward lobes inwardly of the inwardly facing interior edge of said endless track.

11. The system of claim 10 in which said tension strap assembly further includes a plurality of diverging straps, each interconnected between said medial connecting strap and a respective strap connector carried by said inwardly facing inner edge segment of said bag.

12. The system of claim 11 in which each said strap connector includes a grommet formed through said inwardly facing inner edge segment of said bag.

13. The system of claim 12 in which said inwardly facing inner edge segment of said inner portion of said bag extends for a full length of each of said forward and rearward lobes.

14. The system of claim 6 in which said tension assembly includes a tension strap interengaged between opposing strap connectors carried by and formed in said inwardly facing inner edge segment of said bag inwardly of said endless track and on said forward and rearward lobes of said bag.

15. The bag assembly of claim 6 in which said tensioning assembly constricts said entrance into said interior opening of said bag assembly such that said entrance is diametrically smaller than said endless track.

16. A bag assembly for covering an endless track of a heavy equipment vehicle during transport of the vehicle upon a flatbed trailer, said bag assembly comprising:

a flexible outer bag portion for surrounding and covering a portion of the endless track that extends laterally beyond a side edge of the flatbed trailer;

a flexible inner bag portion joined to said outer bag, portion for partially covering a portion of the endless track disposed laterally inwardly of the side edge of the trailer bed, said inner and outer portions including forward and rearward lobes for respectively covering forward and rearward end portions of the endless track, said inner bag portion including a recess for accommodating a bottom section of the endless track such that said bottom section of said endless track engages the trailer bed directly through said recess, said bag assembly having an interior opening for accommodating the endless track and an entrance into said interior opening for selectively introducing the endless track into and removing the endless track from said interior opening of said bag assembly, said inner bag portion further including an inwardly facing inner edge segment through which said entrance into said interior opening of the bag is formed, which inwardly facing inner edge segment wraps around and vertically covers and obscures an inwardly facing interior edge of the endless track for the entire portion of the endless track that does not directly touch the trailer; and a tensioning assembly engaged with and carried by said inwardly facing inner edge segment of the bag inwardly of the track to pull together opposing portions of said inwardly facing edge segment in said forward and rearward lobes respectively to constrict said entrance of said opening of said bag and hold said inwardly facing inner edge segment of said bag in snug interengagement with and covering the inwardly facing interior edge of the endless track such that debris dislodged from the inwardly facing interior edge segment of the endless track is retained more effectively within the bag.

17. The bag assembly of claim 16 in which said tensioning assembly constricts said entrance into said interior opening of said bag such that said entrance is diametrically smaller than the endless track.

* * * * *